United States Patent [19]

Bishop

[11] 3,999,779
[45] Dec. 28, 1976

[54] CAMBER ADJUSTMENT LINKAGE

[75] Inventor: Joseph Gerald Bishop, West Bloomfield, Mich.

[73] Assignee: American Motors Corporation, Detroit, Mich.

[22] Filed: Feb. 23, 1976

[21] Appl. No.: 660,082

[52] U.S. Cl. ............................................. 280/661
[51] Int. Cl.$^2$ ..................................... B62D 17/00
[58] Field of Search .................................. 280/661

[56] References Cited
UNITED STATES PATENTS

| | | | |
|---|---|---|---|
| 3,497,233 | 2/1970 | Bolaski | 280/661 |
| 3,498,630 | 3/1970 | Crawford | 280/661 X |

*Primary Examiner*—Joseph F. Peters
*Assistant Examiner*—Terrance L. Siemens
*Attorney, Agent, or Firm*—Reising, Ethington, Barnard, Perry and Brooks

[57] ABSTRACT

A wheel camber adjustment linkage of the disclosure is utilized with a vehicle independent suspension system to sense and correct an improper wheel camber angle condition. The linkage includes first and second portions associated with a suspension control arm on which an adjustable joint is mounted. The first linkage portion senses the angular relationship between the control arm and a wheel supporting member mounted on the control arm by the adjustable joint. The second linkage portion senses the angular relationship between the control arm and the sprung mass of the vehicle. The angular relationships sensed by the two linkage portions are compared so as to determine whether adjustment of the joint is necessary to correct the wheel camber angle. If correction is required, the angular linkage movement during suspension jounce provides the impetus for the adjustment. Each linkage portion preferably includes a push-pull link and a lever pivoted to each other. The push-pull link of the first linkage portion is connected to the wheel supporting member and the push-pull link of the second linkage portion is connected to the sprung vehicle mass. The levers of the linkage portions are pivotally connected to each other about a first axis and one of the levers is pivoted to the control arm about a second axis that is spaced from the first axis. The other lever supports a pair of pawls that are positioned on opposite sides of a toothed input member of the adjustable joint. A positive or negative wheel camber angle causes one or the other of the pawls to engage the input member so as to adjust the joint as the linkage moves angularly.

23 Claims, 5 Drawing Figures

CAMBER ADJUSTMENT LINKAGE

BACKGROUND OF THE INVENTION

1. Field of the Invention

The present invention relates to a camber adjustment linkage for use with a vehicle independent suspension system so as to sense an improper wheel camber angle condition and to provide correction of such a condition by using vehicle jounce as the impetus for the correction.

2. Description of the Prior Art

Vehicle independent suspension systems are presently incorporated in production vehicles such as automobiles, trucks and vans, etc. Such suspension systems each support an associated wheel and tire for vertical up and down movement that is known as suspension jounce. On a level roadway, the angle between the center plane of the wheel and a vertical plane that extends through the wheel center point along the direction the wheel is directed is referred to as the wheel camber angle. When the center plane of the wheel is tilted inboard of the vertical plane at the lower side of the wheel, a positive wheel camber angle is present. A negative wheel camber angle is present when the center plane of the wheel is tipped outboard of the vertical plane at the lower side of the wheel. Maximum tire mileage is usually achieved when the wheel camber angle is zero degrees, i.e. the center plane of the wheel is oriented vertically.

U.S. production vehicles usually incorporate independent suspension systems only with the front wheels. However, some domestic vehicles do include rear independent suspension systems as well instead of the more conventional solid axle interconnection between the rear wheels. Foreign vehicles conventionally are manufactured with independent suspension systems for both the front and rear wheels.

Domestic and foreign independent suspension systems conventionally incorporate at least one control arm and a wheel supporting member mounted on the control arm. If the suspension system is for a front wheel, the wheel supporting member constitutes a steering knuckle which is movable angularly about a steering axis thereof to control the direction of vehicle travel. A wheel spindle constitutes the wheel supporting member if the independent suspension system is utilized with a rear wheel.

Usually, a pair of control arms are utilized with domestic independent suspension systems to mount the wheel supporting member. For example, the steering knuckle of a front independent suspension system will be supported on upper and lower control arms by upper and lower ball joints. Foreign independent suspension systems utilize a cylinder-like strut that cooperates with a single control arm to mount the wheel supporting member.

Wheel camber angle is conventionally measured by instruments which shine a light past the wheel onto a screen having indications that tell whether the camber angle is proper. The camber angle measurement by these conventional instruments is vehicle attitude sensitive. Normal camber angle change on conventional suspension systems is in the area of one half to one degree of change per inch of suspension travel. Consequently, domestic manufacturers generally specify a vehicle attitude or vehicle loading condition at which the camber angle must be checked or set to a designated amount. Conventional optical measurement equipment requires an accurately leveled base or platform from which to make measurements on the vehicle. The vehicle when placed on the base or platform must be in the correct attitude designated by the manufacturer and is sensitive to tire pressures, wheel run out, fuel and cargo loadings.

If the camber angle is not proper, adjustment is conventionally accomplished in one of two ways. The mounting of the suspension system on the sprung mass of the vehicle may include accomodations for shims whose thickness determines the camber angle. Thus, a positive or negative camber angle can be changed by adding thicker or thinner shims as required. Another way to adjust the camber angle is to have the components of the suspension system include a suitable threaded or eccentric interconnection that may be manually adjusted to provide correction of an improper wheel camber angle. The following U.S. Patents disclose various suspension systems having wheel camber adjustment generally of these types: U.S. Pat. Nos. 2,605,118; 2,664,297; 2,684,253; 2,900,196; 2,923,555; 3,033,588; 3,034,810; and 3,342,507.

Non-conventional vehicle independent suspension systems have also included load bearing components that function to maintain a proper wheel camber angle; see U.S. Pat. Nos. 3,479,050; 3,497,233; and 3,711,113. Additionally, U.S. Pat. No. 2,907,578 discloses a vehicle independent suspension system including a piston and cylinder whose retraction and extension automatically controls the camber angle of a wheel carried by this suspension system.

SUMMARY OF THE INVENTION

The present invention relates to a wheel camber adjustment linkage utilized with a vehicle independent suspension system to sense the camber angle of a wheel supported thereby and to automatically adjust the camber angle if necessary. A first portion of the linkage extends between a wheel supporting member and a control arm of the suspension system so as to sense the angular relationship between these components throughout the vertical travel of the system during jounce. A second linkage portion extends and senses the angular relationship between the control arm and the sprung mass of the vehicle throughout the vertical suspension movement. The linkage is designed in such a manner that a constant or known angular relationship of the linkage portions is maintained throughout the travel limits of the suspension system. The linkage compares the angular relationships sensed by the first and second linkage portions to determine whether the wheel supporting member is angularly oriented so that the camber angle of a wheel supported thereby is proper. An adjustable joint which supports the wheel supporting member on the control arm is selectively coupled to the linkage when an improper wheel camber angle is sensed. Angular movement of the coupled linkage under the impetus suspension of jounce causes adjustment of the joint to vary the angular orientation of the wheel supporting member and to thereby correct the wheel camber angle. The linkage is automatically uncoupled from the joint once the camber angle has been corrected.

The adjustment linkage is not vehicle attitude sensitive and senses the manufacturers designated camber angle at any and all positions of suspension travel. Therefore, a level base or platform for making measurements and uniform vehicle loading during measurement are not required.

The preferred embodiment of the adjustment linkage disclosed is utilized with a front vehicle independent suspension system. Each linkage portion of this linkage includes a push-pull link and a lever pivoted to each other. The push-pull link of the first linkage portion is connected to a steering knuckle of the suspension system which supports the associated vehicle wheel and which is angularly movable about a steering axis of the knuckle. The push-pull link of the second linkage portion is connected to the sprung vehicle mass. A pivotal connection interconnects the two levers of the linkage portions about a first axis and a second pivotal connection pivots one of the levers to an upper control arm of the system about a second axis that is spaced from the first axis in a parallel relationship. The steering knuckle is also mounted on the control arm by an adjustable ball joint including a toothed input member that is rotatable about the second axis. The lever which is not pivoted to the control arm supports a pair of pawls on opposite sides of the toothed input member of the joint. The linkage geometry is such that these pawls are disengaged from the input member during angular linkage movement when the camber angle of a wheel carried by the steering knuckle is proper. However, when the wheel camber angle is not proper, one or the other of the pawls is engaged with the input member of the joint and the angular linkage movement during suspension jounce causes this pawl to rotate the input member to provide adjustment of the joint that corrects the wheel camber angle.

The two levers of the linkage are pivotally positioned with respect to each other at a predetermined angle about their interconnection at the first axis when the wheel camber angle is proper and are positioned in one direction or the other from the predetermined angle when the camber angle is not proper in direct relationship to the amount of camber angle error. This movement from the predetermined angle causes an adjust condition of the levers that causes the engagement of one or the other of the pawls to provide the adjustment of the joint. The lever which supports the pawls includes stop surfaces associated with the pawls. These pawls are pivotally mounted for movement into and out of engagement with their associated stop surfaces and are biased into engagement therewith by associated springs. During angular linkage movement when either pawl is rotating the input member, this pawl is engaged with its stop surface to provide a direct path of force for rotating the input member. Angular linkage movement in the opposite direction causes the pawl to ratchet over the teeth of the input member as the pawl rotates against the bias of its associated spring. The input member is thus rotated in one direction or the other to provide adjustment of the joint that angularly locates the steering knuckle so that the wheel supported thereby has a proper camber angle.

A ball and socket connection connects the push-pull link of the first linkage portion to the steering knuckle generally along the steering axis thereof so that the angular steering angle of the knuckle does not prevent the functioning of the linkage. Likewise, ball and socket connections are utilized to connect the push-pull link and the lever of each linkage portion as well as to connect the push-pull link of the second linkage portion to the sprung mass of the vehicle so as to accomodate for angular variance between the pivotal axes of the upper control arm and a lower control arm of the suspension system. The ball and socket connection between the lever which supports the pawls and its associated push-pull link is preferably of a lost motion type so that the wheel camber angle can vary a predetermined amount before linkage adjustment takes place. A detent normally positions the two levers at their predetermined angle so that there is normally no rotation between the levers despite the lost motion permitted by the one ball and socket connection. The predetermined amount of lost motion is permitted to control the camber angle acceptable tolerance band and to permit small camber angle changes, without adjustment, during dynamic maneuvers which result in lateral displacements of the suspension system acting on the elastomeric pivot bushings.

The predetermined angular relationship of the two levers is maintained throughout the suspension jounce travel and wheel steering motions. The angular relationship of the levers changes from the predetermined position in a direct relationship to the amount of camber error.

The adjustable ball joint utilized with the linkage preferably includes a movable ball socket that is connected to the input member of the joint by a worm gear drive. This worm gear drive provides a mechanical advantage that normally prevents reverse driving of the movable ball socket by forces applied to the steering knuckle. A housing of the adjustable joint mounts the ball socket for inboard and outboard pivotal movement about an axis that is external from the joint. The steering knuckle orientation is angularly changed by this movement to correct the wheel camber angle.

The objects, features and advantages of the present invention are readily apparent from the detailed description of the preferred embodiment taken in connection with the accompanying drawings.

DETAILED DESCRIPTION OF THE PREFERRED EMBODIMENT

Figure 1:
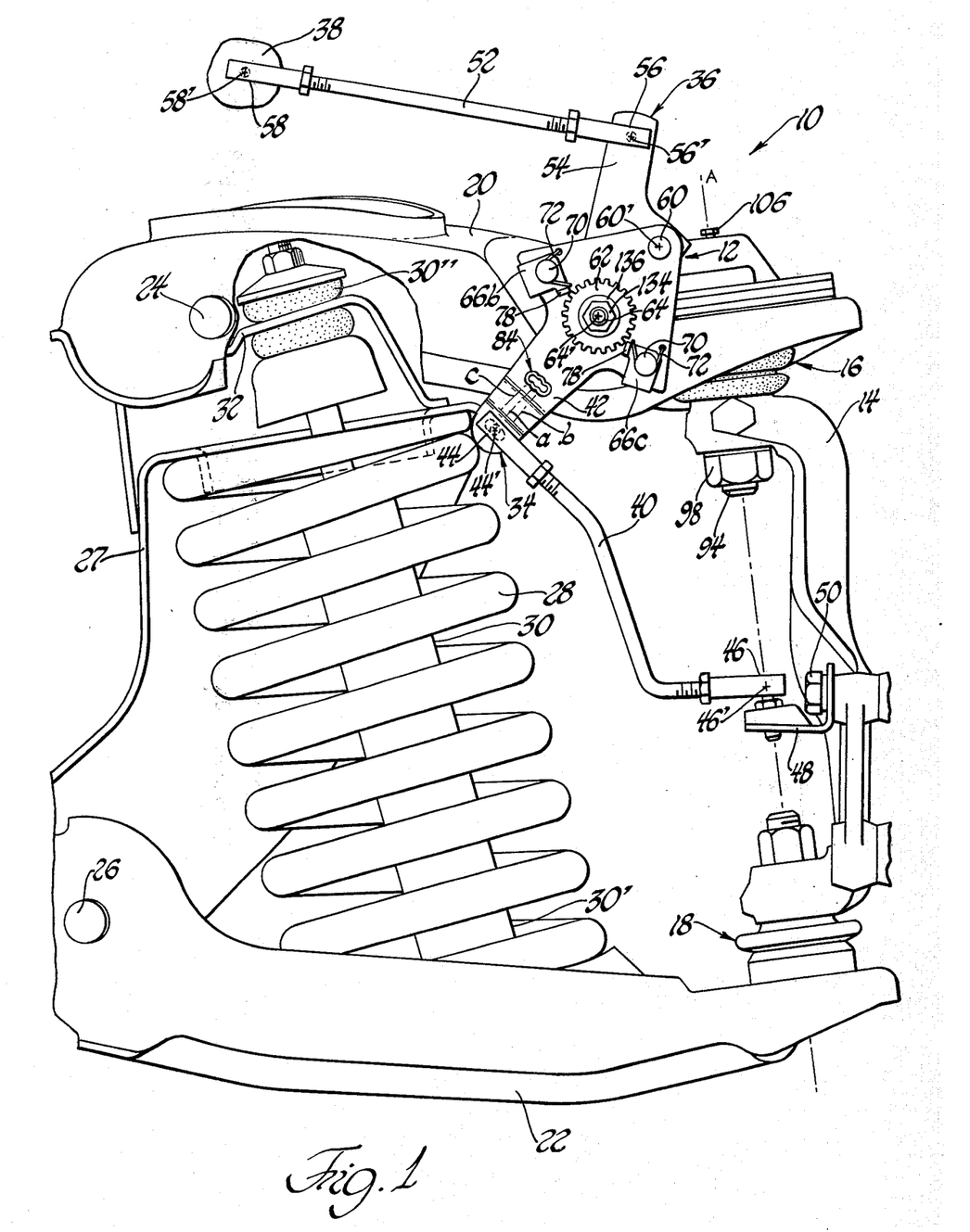
FIG. 1 is an elevation view of a vehicle independent suspension system as viewed looking in a rearward direction to illustrate a camber adjustment linkage thereof that embodies the present invention.

Referring to FIG. 1 of the drawings, a vehicle front independent suspension system is generally indicated by reference numeral 10 and includes a wheel camber angle adjustment linkage 12 that is constructed in accordance with the present invention. The linkage automatically senses the angular orientation of a steering knuckle 14 of the suspension system so as to determine whether a wheel supported thereby has the proper camber angle and, if this angle is not proper, the linkage provides adjustment of the steering knuckle so as to correct the wheel camber angle. An adjustable upper ball joint 16, which will be hereinafter described in detail, and a conventional lower ball joint 18 mount the steering knuckle 14 on upper and lower control arms 20 and 22 for vertical movement during suspension jounce as well as for angular steering movement about a steering axis A. The upper and lower control arms 20 and 22 are respectively pivoted to the sprung mass of the vehicle by pins 24 and 26 in a conventional manner. A frame member 27 of the sprung vehicle mass seats the upper end of a helical spring 28 whose lower end is seated against the upper side of the lower control arm 22. A shock absorber 30 is received within the center of the spring 28 and has a lower end 30' secured to the lower control arm 22 as well as an upper end 30" secured to a frame member 32 of the sprung vehicle mass. The spring 28 and the shock absorber 30 cooperate during suspension jounce to control the vertical movement of the steering knuckle 14 in a conventional fashion.

The adjustment linkage 12 as seen in FIG. 1 includes first and second linkage portions 34 and 36 for sensing angular relationships of the suspension system. The first linkage portion 34 extends between the steering knuckle 14 and the upper control arm 20 so as to sense the angular relationship of the steering knuckle with respect to this control arm. The second linkage portion 36 extends between the upper control arm and a frame portion 38 of the sprung vehicle mass so as to sense the angular relationship between this control arm and the sprung mass of the vehicle. The angular relationships sensed by these two linkage portions are compared, as will be more fully hereinafter described in detail, to determine whether the steering knuckle is angularly oriented so that the wheel supported thereby has a camber angle that is proper. When an improper camber angle is sensed by these linkage portions, the linkage is selectively coupled to the adjustable ball joint 16 so that angular movement of the linkage under the impetus of suspension jounce provides the adjustment of the joint to correct the camber angle.

With continuing reference to FIG. 1, the first linkage portion 34 includes a push-pull link 40 and a lever 42 that are pivoted to each other by a ball and socket connection 44. Push-pull link 40 is also pivoted by a ball and socket connection 46 to a bracket 48 on the steering knuckle 14. A bolt 50 secures the bracket 48 in position on the steering knuckle so that the center 46' of the ball and socket connection 46 is located generally along the steering axis A of the steering knuckle. Consequently, the steering angle of the knuckle 14 about its steering axis A does not affect the wheel camber angle sensing function of the linkage. The second linkage portion 36 also includes a push-pull link 52 and a lever 54 that are pivoted to each other by a ball and socket connection 56. Push-pull link 52 is also pivotally connected to the frame portion 38 of the sprung vehicle mass by another ball and socket connection 58. A pin 60 pivotally interconnects the levers 42 and 54 of the two linkage portions for rotation about a first axis 60'. A toothed input member 62 of the upper adjustable ball joint 16 is rotatably supported by a shaft 64 about a second axis 64' that is spaced from the first axis 60' in a parallel relationship. Lever 42 of the first linkage portion supports a pair of pawls 66 that rotate the input member 62 of the joint so as to maintain the proper wheel camber angle condition. Lever 54 pivots on shaft 64.

Figures 2, 3:
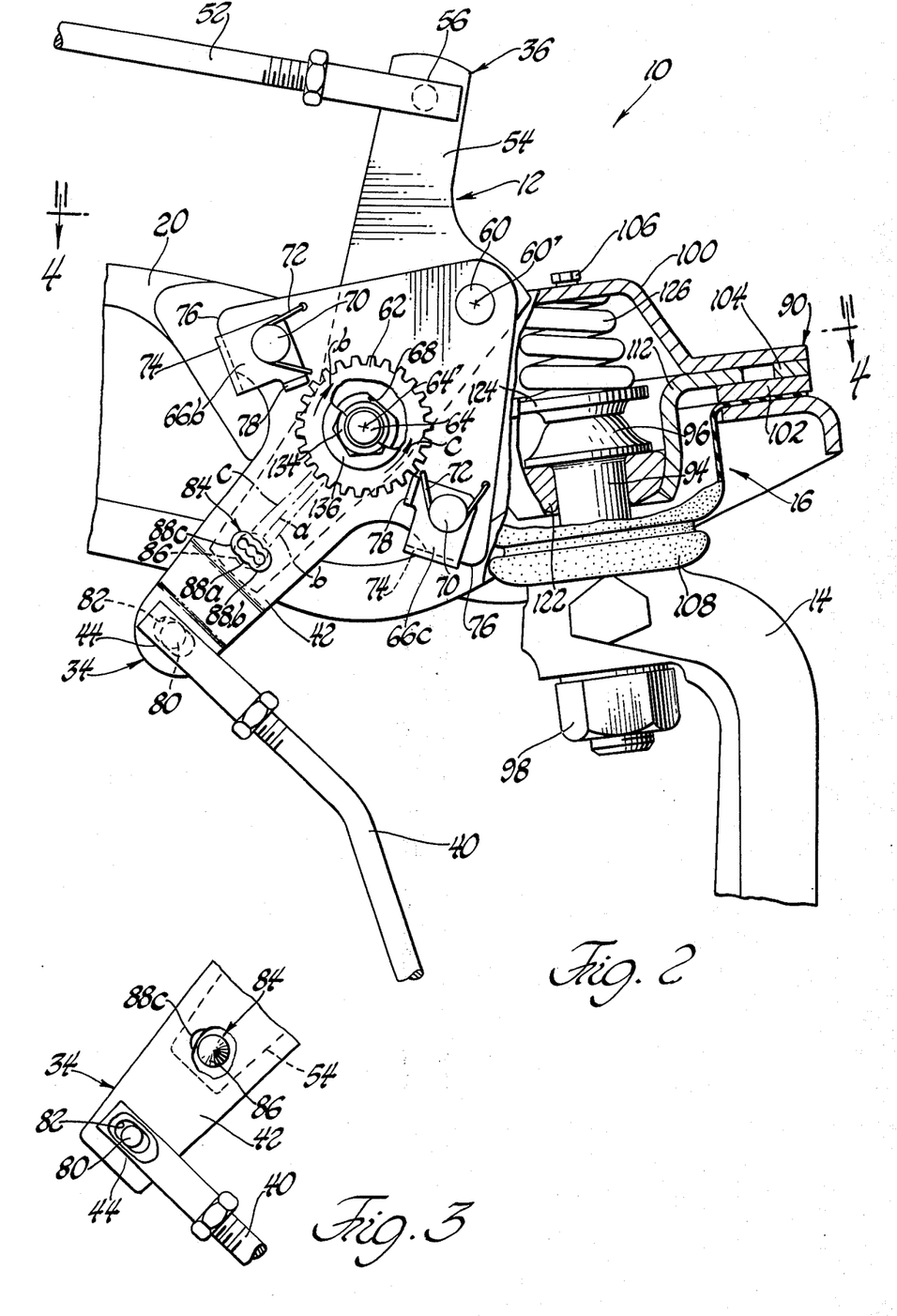
FIG. 2 is an enlarged partially broken away view of the suspension system and camber adjustment linkage shown in FIG. 1.
FIG. 3 is a partially broken away view of a portion of FIG. 2.

Referring to FIG. 2, the lever 42 which supports the pawls 66 defines an opening 68 which receives the shaft 64 so that lever 42 can pivot with respect to the lever 54 about the axis 60' of pin 60. When the linkage 12 senses a proper wheel camber angle condition as reflected by the angular relationships sensed by linkage portions 34 and 36, the levers 42 and 54 are positioned with respect to each other by their associated push-pull links at a predetermined angle about pin 60. This position corresponds to the position $a$ of the linkage arm centerline shown in FIG. 2 and causes the pawls 66 to pivot about the axis 64' of shaft 64 without engaging the toothed input member 62 of the upper adjustable ball joint 16. Sensing of an improper wheel camber angle condition by the linkage 12 causes the lever 42 to pivot relative the lever 54 about the axis 60' of pin 60 so that the lever arm centerline moves to the position $b$ or $c$ shown. If a negative camber angle error is present, the centerline will be located in the position $b$ while it will be in the position $c$ if a positive wheel camber angle error condition exists. The relative pivoting of lever 42 with respect to lever 54 to either position $b$ or $c$ causes an adjust condition of the levers that engages one or the other of the pawls 66 with the toothed periphery of the input member 62 of upper ball joint 16. A negative wheel camber angle error condition causes the pawl referenced by numeral 66$b$ to engage the toothed input member 62 and cause clockwise rotation thereof due to angular linkage movement under the impetus of suspension jounce. Similarly, a positive camber angle condition causes the pawl referenced by numeral 66$c$ to engage the input member 62 and provide counterclockwise rotation thereof due to angular linkage movement under the impetus of suspension jounce. The rotation of the input member causes the adjustment of the upper ball joint 16 that corrects the wheel camber angle condition.

As seen in FIG. 2, each pawl 66$b$ and $c$ is pivoted to the lever 42 by an associated pin 70. Torsional biasing springs 72 normally bias the pawls so as to engage associated stop flanges 74 thereof with stop surfaces 76 on the lever 42. Actuating flanges 78 of the pawls provide the locations thereof where the engagement with the toothed input member 62 takes place. When either of the pawls is rotating the input member 62, its stop flange 74 is engaged with the associated stop surface 76 to provide a direct path of driving force for the pawl through the linkage as the linkage moves angularly in one direction. Angular movement of the linkage in the opposite direction causes the actuating flange 78 to ratchet over the input member 62 in readiness for another linkage stroke that rotates the input member in the appropriate direction. During the ratcheting, the stop flange 74 of the pawl moves out of engagement with its associated stop surface as the pawl pivots about its mounting pin 70.

For proper operation of the camber adjustment linkage 12 to take place, the push-pull links and the levers of the linkage must be associated with the suspension system 10 and the sprung mass of the vehicle at proper locations. Given the shapes and sizes of the linkage components, three points are determinative of proper linkage function. These points, as seen in FIG. 1, are the center 46' of the ball and socket connection 46, the pivotal axis 64' of the shaft 64 about which the levers 42 and 54 rotate due to angular linkage movement, and the center 58' of the ball and socket connection 58. Any two of these points may be arbitrarily selected but there will then be only one location where the third point can be located for the linkage to function properly, i.e. the levers 42 and 54 will be pivotally located with respect to each other so the levers do not move the pawls to adjust joint 16 if the wheel camber angle is proper. The centers 44' and 56' of the ball and socket connections which interconnect the levers and the push-pull levers of the linkage portion also have an effect on the angular movement of the linkage during suspension jounce as the steering knuckle 14 moves vertically. However, once the sizes and the pivotal interconnections between the linkage components are chosen, the three previously mentioned points are the ones which must be located at predetermined locations, as discussed above, for the linkage to function properly.

Referring to FIG. 1, the angles between the links and the levers of each linkage portion 34 and 36 will be decreasing as they sense the angular relationships of the upper control arm 20 with respect to the steering knuckle 14 and the sprung mass of the vehicle, respectively, during upward suspension jounce. If the steering knuckle is oriented properly so that the associated wheel supported thereby has a proper camber angle, both of the levers 42 and 54 will pivot about the axis 64' while located at the previously mentioned predetermined angle with respect to each other such that the pawls 66b and c do not engage the upper ball joint input member 62 to cause rotation thereof that adjusts the joint. Likewise, during downward suspension jounce, the angles between the links and the levers of each linkage portion will be increasing as they sense the angular relationships of the control arm with respect to the steering knuckle 14 and the sprung mass of the vehicle. If a negative camber angle error is sensed, the upper end of the steering knuckle 14 will be located inboard further than it should be for a zero camber angle. Consequently, the lever 42 will then be pivotally positioned with respect to the lever 54 about pin 60 so that the lever arm centerline is located in its position b and the pawl 66b will engage the joint input member 62 to provide clockwise rotation thereof during upward suspension jounce. Similarly, the lever arm centerline of lever 42 shifts with respect to lever 54 to the position c shown so that pawl 66c is engaged with the toothed input member 62 to likewise provide counterclockwise rotation thereof during upward suspension jounce so as to adjust the upper ball joint 16. The upper end of the steering knuckle 14 is then moved in either an inboard or outboard direction to adjust the wheel camber angle until the relative position between the levers 42 and 54 is again at its predetermined angle indicating a proper wheel camber angle.

With combined reference to FIGS. 2 and 3, the ball and socket connection 44 which pivots the push-pull link 40 to the lever 42 includes a lost motion feature that delays the wheel camber adjustment until the camber angle deviates from the proper angle a predetermined extent. A ball 80 of this connection 44 is slidably mounted within a slot 82 in the arm of lever 42 and is also received within a ball socket in the adjacent end of link 40 so as to provide the lost motion interconnection between the link and the lever. A detent generally indicated by 84 normally locates the lever 42 at its position a with respect to lever 54 so that the ball 80 is located centrally along the length of slot 82 when the wheel camber angle is proper. The detent includes a projection 86 on lever 54 and three adjacent depressions 88a, 88b and 88c, FIG. 2, on lever 42. The projection 86 is normally received within the depression 88a so as to locate the levers 42 and 54 with respect to each other at their predetermined angle where no camber adjustment takes place. After the wheel camber angle deviates from the proper angle enough so that adjustment should take place, the ball 80 will have then reached the extent of its travel in slot 82 one way or the other and the lever 42 will then be pulled by the linkage during suspension jounce so that projection 86 moves from the depression 88a to either depression 88b or 88c. Subsequently, suspension jounce will cause the linkage to provide adjustment of the wheel camber angle as the pawls 66b and 66c rotate the toothed ball joint input member 62 as previously described. As the adjustment proceeds, the ball 80 of connection 44 moves to the opposite end of slot 82 and the linkage then pulls the projection 86 back to the central depression 88a so that the levers 42 and 54 are again located at their predetermined angle with respect to each other. The projection 86 and the depressions 88a, b and c cooperate in an overcentering manner in locating the levers 42 and 54 with respect to each other. Once the projection 86 moves past the midpoint between any two depressions, the detent drives the levers as the projection moves into the closer depression. This action causes the ball 80 to be centrally located within the slot 82 after the adjustments have taken place.

Figures 4, 5:
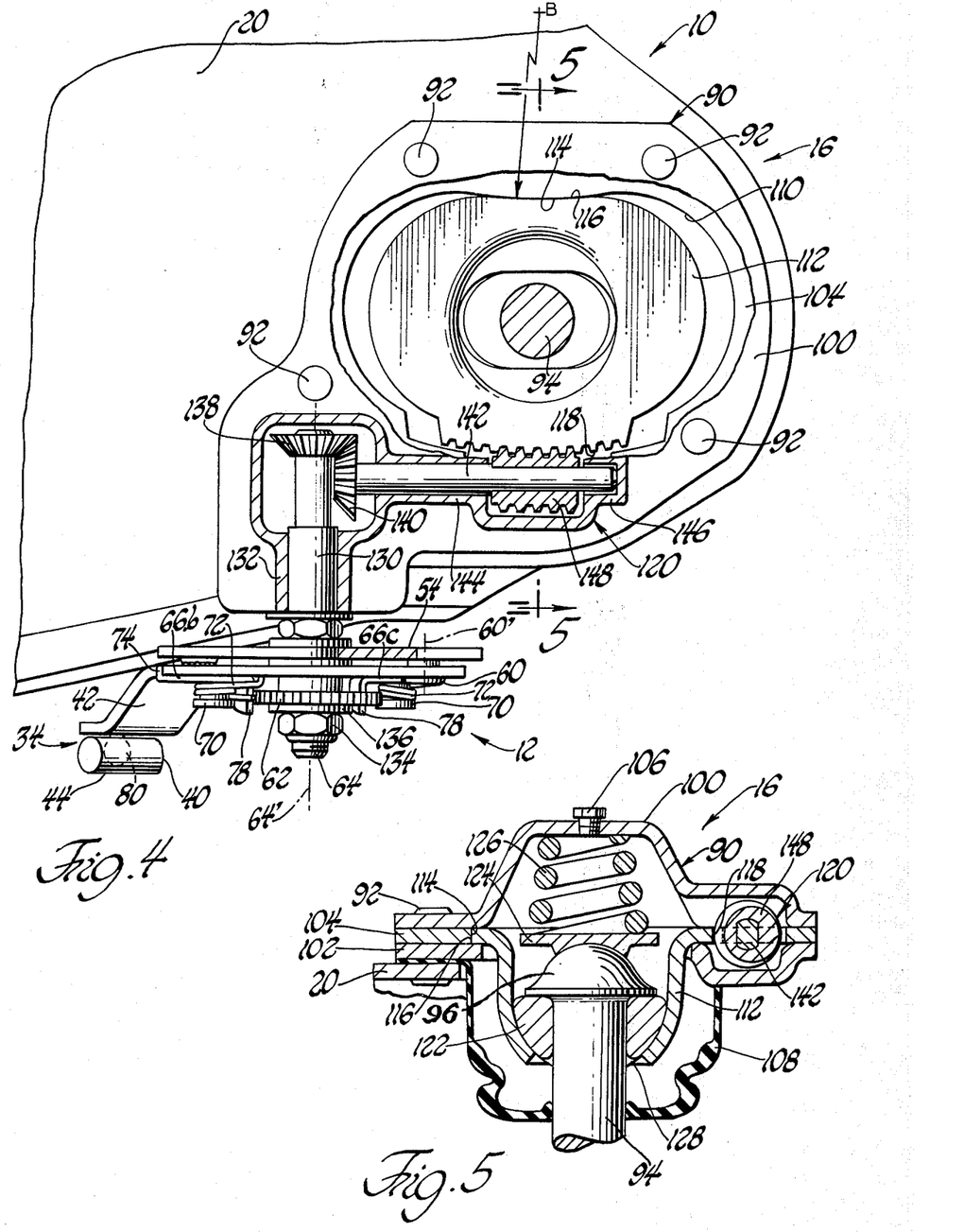
FIG. 4 is a partially broken away view taken generally along line 4—4 of FIG. 2.
FIG. 5 is a sectional view of an adjustable ball joint of the system taken along line 5—5 of FIG. 4.

With reference to FIGS. 4 and 5, the adjustable upper ball joint 16 includes a housing generally indicated by 90 that is secured to the upper control arm 20 by a plurality of rivets 92. A ball stud 94 has an upper ball head 96 received within the joint housing 90 and a lower threaded end that receives a nut 98, see FIGS. 1 or 2 momentarily, for securing the ball stud to the upper end of the steering knuckle 14. Housing 90 is composed of an upper housing member 100, a lower housing member 102, and an intermediate housing member 104. A conventional grease fitting 106, FIG. 5, allows the joint housing 90 to be filled with grease and a grease boot 108 that encircles the ball stud 94 prevents escape of the grease.

As best seen by reference to FIG. 4, the intermediate housing portion 104 defines an opening 110 that has a slightly elongated and arcuate configuration when viewed from above. A ball socket 112, see also FIG. 5, has an upper flanged end that is received within the opening 110 and supported between the upper and lower housing members for movement in inboard and outboard directions with respect to the associated vehicle. Actually, this inboard and outboard movement of the socket takes place about an axis B, FIG. 4, that is located externally of the joint. The opening 110 of the intermediate housing portion 104 defines an arcuate surface 114 that is engaged by a complementary arcuate surface 116 of the ball socket to provide this movement. On the opposite side of the ball stud 94 from these interengaged arcuate surfaces, the ball socket 112 includes a curved gear rack 118 that is driven by a worm gear drive 120 to locate the ball socket. A bearing 122 is supported by the ball socket 112 below the ball head 96 of stud 94 and an upper seat 124 is biased into engagement with the ball head by a helical spring 126. The ball stud 94 extends downwardly through a lower opening 128 in the ball socket 112. Inboard or outboard movement of the ball socket 112 thus moves the ball stud 94 and the upper end of the steering knuckle 14 attached thereto in an inboard or outboard direction so as to adjust the wheel camber angle.

As seen in FIG. 4, the shaft 64 which pivotally supports the lever 54 of the camber adjustment linkage includes a journal portion 130 that is rotatably supported by a bearing portion 132 of the adjustable ball joint housing 90. The toothed input member 62 of this joint is rotatably fixed to this shaft by suitable splines and secured in position on its outer end by a nut 134 and a washer 136. The other end of shaft 64 supports a beveled gear 138 which drives another beveled gear 140 on a shaft 142 of the worm gear drive 120. Shaft 142 is rotatably supported by spaced bearing portions 144 and 146 of the adjustable ball joint housing 90. Between these bearing portions, a worm gear 148 is fixed to shaft 142 and meshed with the curved gear rack 118 of the movable ball socket 112.

Rotation of the toothed input member 62 by the camber adjustment linkage 12 in the manner previously described causes the worm gear drive 120 shown in FIG. 4 to move the ball socket 112 about axis B in either an inboard or outboard direction. If the linkage is correcting a negative camber angle, the ball socket 112 will be moved in an outboard direction so that the ball stud 94 carried thereby moves the upper end of the steering knuckle attached to this stud outwardly. On the other hand, correction of a positive camber angle by the adjustment linkage causes the ball socket 112 to be driven in an inboard direction so that the ball stud 94 carries the upper end of the steering knuckle inwardly to correct the positive camber angle condition. Additionally, the mechanical advantage of the worm gear drive 120 prevents the forces applied to the ball socket 112 from driving the gearing arrangement in a reversed direction. Frictional forces applied to the journal portion 130 of shaft 64 and to the shaft 142 are multiplied by this mechanical advantage so as to provide a positive positioning of the ball socket at a location which provides the proper wheel camber angle.

While a preferred embodiment of the camber adjustment linkage has herein been described in detail, those skilled in the art will recognize various alternative designs and embodiments for practicing the present invention as defined by the following claims.

What is claimed is:

1. In a vehicle independent suspension system including a control arm pivoted to the sprung mass of the vehicle, an adjustable joint mounted on the control arm, and a wheel supporting member mounted on the control arm by the joint for vertical movement with respect to the sprung mass of the vehicle during suspension jounce, a wheel camber adjustment linkage comprising: a first linkage portion extending between the wheel supporting member and the control arm so as to sense the angular relationship between the wheel supporting member and the control arm; The first linkage portion moving angularly during suspension jounce as the wheel supporting member moves vertically; a second linkage portion extending between the sprung mass of the vehicle and the control arm so as to sense the angular relationship between the control arm and the sprung mass of the vehicle; the second linkage portion moving angularly during suspension jounce as the wheel supporting member moves vertically; means for comparing the angular relationships sensed by the first and second linkage portions to determine whether the wheel supporting member is angularly oriented so the camber angle of a wheel supported thereby is proper; and means for selectively connecting the linkage to the adjustable joint to provide adjustment thereof if the camber angle sensed by the comparing means is not proper, the connecting means utilizing suspension jounce through the connected linkage as the impetus for adjustment of the joint so as to correct the wheel camber angle, and the connecting means disconnecting the joint from the linkage when the wheel camber angle sensed by the comparing means is proper.

2. A linkage as in claim 1 wherein each linkage portion includes a push-pull link and a lever pivoted to each other, means pivotally connecting the levers to each other about a first axis, means pivotally connecting one of the levers to the control arm about a second axis at a predetermined location that is spaced from the first axis in a parallel relationship, and means pivotally connecting the push-pull links of the first and second linkage portions respectively to the wheel supporting member and the sprung mass of the vehicle at predetermined locations, the predetermined locations being selected so that the angular linkage movement causes the levers to pivot with each other about the second axis while remaining pivotally fixed with respect to each other at a predetermined angle about the first axis when the wheel camber angle is proper and at an angle other than the predetermined one when the camber angle is not proper.

3. A linkage as in claim 2 wherein the connecting means includes a pair of pawls mounted on the lever which is not pivoted to the control arm, relative movement of the levers from the predetermined angle in either direction about the first axis for a predetermined extent causing an adjust condition of the levers where one of the pawls is coupled with the joint to provide adjustment thereof that corrects the wheel camber angle.

4. A linkage as in claim 3 wherein the joint includes a toothed input member which is engaged and rotated by one of the pawls as a result of angular linkage movement when the levers are in the adjust condition in one direction, and the toothed input member being engaged and rotated by the other pawl as a result of angular linkage movement when the levers are in the adjust condition in the other direction.

5. A linkage as in claim 4 wherein the toothed input member rotates about the first axis about which said one lever is pivoted to the control arm.

6. A linkage as in claim 5 wherein the lever which supports the pawls includes stop surfaces associated therewith as well as means mounting the pawls for movement into and out of engagement with their associated stop surfaces, each pawl being engaged with its associated stop surface while moved by the linkage so as to rotate the input member, and each pawl being capable of moving out of engagement with its stop surface and ratcheting over the toothed input member while moved by the linkage in a direction opposite to the direction of linkage movement causing the input member rotation.

7. A linkage as in claim 6 which includes springs for biasing the pawls into engagement with their associated stop surfaces.

8. A linkage as in claim 6 which includes a lost motion connection connecting the push-pull link supporting the pawls to its associated lever so that the wheel camber angle can vary to a certain extent before the levers pivot relative to each other about the first axis, and a detent between the levers that normally positions the levers at the predetermined angle.

9. A linkage as in claim 6 wherein the joint includes a movable ball socket and a worm gear drive that connects the toothed input member to the movable ball socket.

10. A linkage as in claim 9 wherein the joint includes a housing that mounts the movable ball socket for the pivotal inboard and outboard movement about an axis external from the joint.

11. In a vehicle independent suspension system including a control arm pivoted to the sprung mass of the vehicle, an adjustable joint mounted on the control arm, and a wheel supporting member mounted on the control arm by the joint, a wheel camber adjustment linkage comprising: a first linkage portion including a push-pull link and a lever pivoted to each other; a connection that connects the push-pull link of the first linkage portion with the wheel supporting member at a predetermined location; a second linkage portion including a push-pull link and a lever pivoted to each other; a connection that connects the push-pull of the second linkage portion with the sprung mass of the vehicle at a predetermined location; means pivotally connecting the levers of the linkage portions to each other about a first axis; means pivotally connecting one of the levers to the control arm about a second axis that is spaced from the first axis in a parallel relationship at a predetermined location; suspension jounce causing the wheel supporting member to move vertically and to move the linkage portions angularly; the predetermined locations being selected such that the levers of the linkage during the angular movement thereof are positioned relative to each other about the first axis at a predetermined angle when the wheel supporting member is oriented so a wheel carried thereby has a camber angle that is proper; the levers being positioned about the first axis with respect to each other in either direction from the predetermined angle in an adjust condition when the wheel supporting member is angularly oriented so a wheel carried thereby has a camber angle that deviates from the proper one a certain extent; the joint including an input member rotatable about the second axis about which the one lever is pivoted to the control arm; and a pair of pawls mounted on the other lever on opposite sides of the input member of the joint, one pawl rotating the input member due to angular linkage movement when the levers are positioned in the adjust condition in one direction from the predetermined angle and the other pawl rotating the input member when the levers are positioned in the adjust condition in the other direction from the predetermined angle; and the input member rotation causing the adjustable joint to correct the wheel camber angle.

12. In a vehicle front independent suspension system including a control pivoted to the sprung mass of the vehicle, an adjustable ball joint mounted on the control arm, and a steering knuckle mounted on the control arm by the adjustable ball joint for vertical movement with respect to the sprung vehicle mass during suspension jounce and for angular movement about a steering axis of the knuckle, a camber adjustment linkage comprising: a first linkage portion extending between the control arm and the steering knuckle at a location generally along the steering axis of the knuckle; the first linkage portion sensing the angular relationship between the control arm and the steering knuckle and moving angularly during suspension jounce as the steering knuckle moves vertically; a second linkage portion extending between the sprung mass of the vehicle and the control arm so as to sense the angular relationship therebetween; the second linkage portion moving angularly during suspension jounce as the steering knuckle moves vertically; means for comparing the angular relationships sensed by the first and second linkage portions to determine whether the steering knuckle is angularly oriented so the camber angle of a wheel supported thereby is proper; and means for selectively connecting the linkage to the ball joint to provide the adjustment thereof if the wheel camber angle is not proper, said connecting means utilizing suspension jounce through the angularly moving linkage as the impetus for adjustment of the joint so as to correct the wheel camber angle, and the connecting means disconnecting the joint from the linkage when the wheel camber angle is proper.

13. A linkage as in claim 12 wherein each linkage portion includes a push-pull link and a lever pivoted to each other, means pivotally connecting the levers to each other about a first axis, means pivotally connecting one of the levers to the control arm about a second axis that is spaced from the first axis in a parallel relationship at a predetermined location, and means pivotally connecting the push-pull links of the first and second linkage portions respectively to the steering knuckle and the sprung mass of the vehicle at predetermined locations; and the predetermined locations being selected such that the levers pivot with each other about the second axis while remaining pivotally located with respect to each other at a predetermined angle about the first axis when the wheel camber angle is proper and at an angle other than the predetermined one when the camber angle is not proper.

14. A linkage as in claim 13 wherein the connecting means includes a pair of pawls mounted on the lever which is not pivoted to the control arm, relative movement of the levers from the predetermined angle in either direction about the first axis for a predetermined extent causing an adjust condition of the levers where one of the pawls is coupled with the joint to provide adjustment thereof that corrects the wheel camber angle.

15. A linkage as in claim 14 wherein the joint includes a toothed input member rotatable about the second axis, the input member being engaged and rotated by one of the pawls as a result of angular linkage movement when the levers are in the adjust condition in one direction, and the toothed input member being engaged and rotated by the other pawl as a result of angular linkage movement when the levers are in the adjust condition in the other direction.

16. A linkage as in claim 15 wherein the lever which supports the pawls includes stop surfaces associated therewith as well as means mounting the pawls for movement into and out of engagement with their associated stop surfaces, each pawl being engaged with its associated stop surface while moved by the linkage so as to rotate the input member, and each pawl being capable of moving out of engagement with its stop surface and ratcheting over the toothed input member while moved by the linkage in a direction opposite to the direction of linkage movement causing the input member rotation.

17. A linkage as in claim 16 which includes springs for biasing the pawls into engagement with their associated stop surfaces.

18. A linkage as in claim 16 which includes a lost motion connection connecting the push-pull link supporting the pawls to its associated levers so that the wheel camber angle can vary to a certain extent before the levers pivot relative to each other about the first axis, and a detent between the levers that normally positions the levers at the predetermined angle but allows movement therefrom to the adjust condition.

19. A linkage as in claim 15 wherein the joint includes a movable ball socket and a worm gear drive that connects the toothed input member to the movable ball socket.

20. A linkage as in claim 19 wherein the joint includes a housing that mounts the movable ball socket for pivotal inboard and outboard movement about an axis external from the joint.

21. A linkage as in claim 13 which includes a ball and socket connection that connects the push-pull link of the first linkage portion to the steering knuckle at a location generally along the steering axis thereof.

22. A linkage as in claim 21 wherein each linkage portion includes a ball and socket connection that pivotally connects the push-pull link and lever thereof.

23. In a vehicle front independent suspension system including upper and lower control arms pivoted to the sprung mass of the vehicle, an adjustable upper ball joint mounted on the upper control arm and a lower ball joint mounted on the lower control arm, and a steering knuckle mounted on the control arms by the ball joints for vertical movement with respect to the sprung mass of the vehicle during suspension jounce and for angular movement about a steering axis of the knuckle, a camber adjustment linkage comprising: a first linkage portion including a push-pull link and a lever pivoted to each other; a ball and socket connection that connects the push-pull link of the first linkage portion to the steering knuckle generally along the steering axis thereof at a predetermined location; a second linkage portion including a push-pull link and a lever pivoted to each other; a connection that connects the push-pull link of the second linkage portion to the sprung mass of the vehicle at a predetermined location; a pivotal connection that interconnects the levers of the linkage portions about a first axis; a pivotal connection that connects one of the levers to the upper control arm about a second axis spaced from the first axis in a parallel relationship at a predetermined location; the first linkage portion sensing the angular relationship between the control arm and the steering knuckle and moving angularly during suspension jounce as the steering knuckle moves vertically; the second linkage portion sensing the angular relationship between the control arm and the sprung mass of the vehicle and moving angularly during suspension jounce as the steering knuckle moves vertically; the predetermined locations being selected such that the angular linkage movement causes the levers to pivot with each other about the second axis while being maintained at a predetermined angle with respect to each other about the first axis when the steering knuckle is angularly oriented so the camber angle of a wheel supported thereby is proper; the levers being located with respect to each other in either direction from the predetermined angle to indicate the wheel camber angle is not proper; the adjustable upper ball joint including a toothed input member rotatable about the second axis along with the one lever which is pivoted to the upper control arm thereabout; and a pair of pawls mounted on the other lever on opposite sides of the toothed input member of the adjustable ball joint, the pawls being disengaged from the input member when the camber angle is proper with the levers located at their predetermined angle about the first axis, one of the pawls being engaged with the input member when the levers are located about the first axis in one direction from the predetermined angle to indicate an improper wheel camber angle and this engagement utilizing angular linkage movement during suspension jounce to rotate the input member so as to adjust the upper ball joint and thereby correct the camber angle, and the other pawl being engaged with the input member when the levers are located about the first axis in the other direction from the predetermined angle so as to indicate an improper wheel camber angle and this latter engagement utilizing angular linkage movement during suspension jounce to rotate the input member so as to adjust the upper ball joint and thereby correct the camber angle.

* * * * *